US011392863B2

(12) United States Patent
Vashisht et al.

(10) Patent No.: US 11,392,863 B2
(45) Date of Patent: Jul. 19, 2022

(54) OPTIMIZING DYNAMIC OPEN SPACE ENVIRONMENTS THROUGH A RESERVATION SERVICE USING COLLABORATION DATA

(71) Applicant: Cisco Technology Inc., San Jose, CA (US)

(72) Inventors: Vikas Vashisht, Morrisville, NC (US); Alberto J. Montilla Bravo, Allen, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/993,852

(22) Filed: Aug. 14, 2020

(65) Prior Publication Data

US 2022/0053036 A1 Feb. 17, 2022

(51) Int. Cl.
| | |
|---|---|
| *G06Q 10/02* | (2012.01) |
| *H04L 65/403* | (2022.01) |
| *G06Q 10/10* | (2012.01) |
| *H04L 12/18* | (2006.01) |
| *G06Q 10/06* | (2012.01) |

(52) U.S. Cl.
CPC ......... *G06Q 10/02* (2013.01); *G06Q 10/0631* (2013.01); *G06Q 10/06314* (2013.01); *G06Q 10/1095* (2013.01); *H04L 12/1818* (2013.01); *H04L 12/1822* (2013.01); *H04L 65/403* (2013.01)

(58) Field of Classification Search
CPC ............... G06Q 10/02; G06Q 10/0631; G06Q 10/06314; G06Q 10/1095; H04L 12/1818; H04L 65/403; H04L 12/1822
See application file for complete search history.

(56) References Cited

U.S. PATENT DOCUMENTS

| | | | |
|---|---|---|---|
| 8,041,586 B2 | 10/2011 | Jethani et al. | |
| 8,046,410 B1 * | 10/2011 | Chen | H04L 12/1822 709/204 |
| 9,392,038 B2 * | 7/2016 | Robinson | G06Q 10/1095 |
| 10,225,707 B1 | 3/2019 | Scheper et al. | |

(Continued)

FOREIGN PATENT DOCUMENTS

WO WO-2015040508 A1 * 3/2015 ......... G01C 21/3492

*Primary Examiner* — Michael A Keller
(74) *Attorney, Agent, or Firm* — Baker Botts, LLP

(57) ABSTRACT

The present disclosure is directed to optimizing dynamic open space environments and includes one or more processors and one or more computer-readable non-transitory storage media coupled to the one or more processors and comprising instructions that, when executed by the one or more processors, cause one or more components to perform operations including receiving a reservation request for a workspace through a user device associated with a user; deriving dynamic user information comprising collaboration data derived from a collaboration service, the collaboration data based on a collaboration history of the user; analyzing the user information to determine one or more workspace suggestions for the user; transmitting the one or more workspace suggestions to the user device; receiving, through the user device, a workspace selection from the one or more workspace suggestions; and updating a reservation of the user in accordance with the workspace selection.

20 Claims, 3 Drawing Sheets

(56) References Cited

U.S. PATENT DOCUMENTS

| | | |
|---|---|---|
| 10,373,086 B2 | 8/2019 | Remaker |
| 2014/0278594 A1 | 9/2014 | Vivadelli et al. |
| 2015/0244981 A1* | 8/2015 | Johnson .............. H04L 65/1076 |
| | | 348/14.07 |
| 2017/0068906 A1* | 3/2017 | Korycki ............... G06Q 10/107 |
| 2019/0228348 A1 | 7/2019 | O'Keefe-Sally et al. |
| 2019/0386842 A1* | 12/2019 | Silva ................... H04L 12/1822 |
| 2020/0410453 A1* | 12/2020 | Nalliah ................... G06F 16/29 |
| 2021/0133692 A1* | 5/2021 | Deluca ..................... G06N 5/02 |

* cited by examiner

OPTIMIZING DYNAMIC OPEN SPACE ENVIRONMENTS THROUGH A RESERVATION SERVICE USING COLLABORATION DATA

TECHNICAL FIELD

The present disclosure generally relates to open space environments, and more specifically to optimizing dynamic open space environments through a reservation service using collaboration data.

BACKGROUND

An open space work environment provides an open-plan having few or no enclosed office rooms or cubicles for employees. By reducing or eliminating private offices and spaces, open space work environments offer various benefits that may be lacking in traditional offices, including flexibility in the usage of spaces, increased collaboration and engagement between team members, and decreased waste in terms of unused real estate within an enterprise.

DESCRIPTION OF EXAMPLE EMBODIMENTS

Overview

Figure 1:
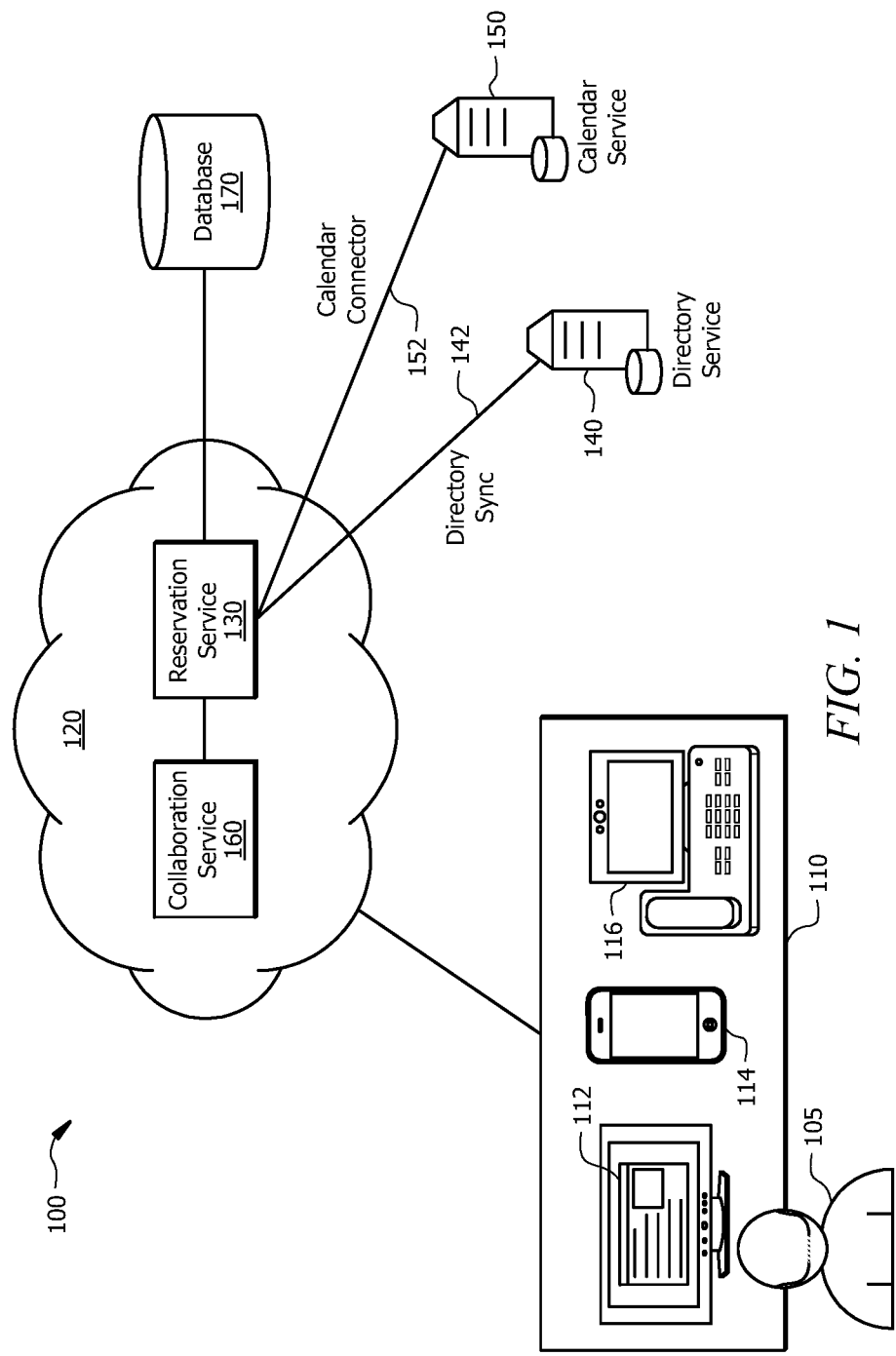
FIG. 1 illustrates a system for optimizing dynamic open space environments, in accordance with certain embodiments.

According to an embodiment, a system may include one or more processors and one or more computer-readable non-transitory storage media comprising instructions that, when executed by the one or more processors, cause one or more components of the system to perform operations including, receiving a reservation request for a workspace through a user device associated with a user; deriving dynamic user information, wherein the user information comprises collaboration data derived from a collaboration service, the collaboration data based on a collaboration history of the user that includes identification information of one or more collaborators who are determined to have been engaged in enhanced communications with the user during a predetermined period of time; analyzing the user information to determine one or more workspace suggestions for the user; transmitting the one or more workspace suggestions to the user device; receiving, through the user device, a workspace selection from the one or more workspace suggestions; and updating a reservation of the user in accordance with the workspace selection.

Additionally, the one or more collaborators may be determined to have been engaged in enhanced communications with the user based on an analysis of weighted communication factors, the weighted communication factors comprising one or more of frequency of communications between the user and the one or more collaborators, duration of the communications, modes of the communications, and a number of participants involved in the communications. The modes of the communications may include one or more of the following: chatting, electronic messaging, video calling, audio calling, video conferencing, audio conferencing, online meetings, and other modes that allow for sharing of information and content with the one or more collaborators. Further, an algorithm may be applied to the weighted communication factors to determine the one or more collaborators who have been engaged in enhanced communications with the user.

Moreover, the user information may further include directory data derived from a directory service, the directory data associated with organizational information of the user.

Additionally, the user information may further include calendar data derived from a calendar service, the calendar data associated with a daily schedule of the user and daily schedules of collaborators who collaborate with the user.

Further, the one or more workspace suggestions, along with one or more reasons for suggesting the workspace suggestions, may be displayed in a map format on the user device.

According to another embodiment, a method may include the steps of receiving a reservation request for a workspace through a user device associated with a user; deriving dynamic user information, wherein the user information comprises collaboration data derived from a collaboration service, the collaboration data based on a collaboration history of the user that includes identification information of one or more collaborators who are determined to have been engaged in enhanced communications with the user during a predetermined period of time; analyzing the user information to determine one or more workspace suggestions for the user; transmitting the one or more workspace suggestions to the user device; receiving, from the user device, a workspace selection from the one or more workspace suggestions; and updating a reservation of the user in accordance with the workspace selection.

According to yet another embodiment, one or more computer-readable non-transitory storage media may embody instructions that, when executed by a processor, cause the performance of operations, including receiving a reservation request for a workspace through a user device associated with a user; deriving dynamic user information, wherein the user information comprises collaboration data derived from a collaboration service, the collaboration data based on a collaboration history of the user that includes identification information of one or more collaborators who are determined to have been engaged in enhanced communications with the user during a predetermined period of time; analyzing the user information to determine one or more workspace suggestions for the user; transmitting the one or more workspace suggestions to the user device; receiving, from the user device, a workspace selection from the one or more workspace suggestions; and updating a reservation of the user in accordance with the workspace selection.

Technical advantages of certain embodiments of this disclosure may include one or more of the following. The systems and methods described herein may allow for the reservation of workspaces in dynamic open space environments. Unlike static environments (where information is constant and unchanging), dynamic open space environments account for change and mobility in the behavior of employees and users. The present disclosure provides a reservation system wherein a workspace (such as a desk, work station, or other space) may be reserved based on dynamic user information derived from directory services, calendar services, and/or collaboration services in the dynamic open space environment. By analyzing this information, an efficient workspace may be suggested for any given day based on, for example, the location of the user's teammates, the schedule of the user, and/or the locations of the collaborators the user has most recently engaged with.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Open space work environments are generally designed to foster creativity and collaboration among employees, while decreasing maintenance costs and maximizing real estate usage for enterprises. In a dynamic open space work environment, an enterprise employee (referred to hereafter as a "user") may select a desk, table, or work station (generally referred to hereafter as a "workspace") from among a plurality of workspaces when arriving at work each morning. The workspace selected by the user may vary from day to day. For example, the user's selection may be based on his daily schedule, the locations of his meetings, the locations of his team members, etc. The present disclosure provides systems and methods that assist a user in dynamically selecting an optimal desk or workspace for the day based on various factors, as described below.

FIG. 1 depicts a system 100 for optimizing dynamic open space environments by providing a reservation service for making and managing workspace reservations in an open space environment. While the system 100 is designed for use by a plurality of users, for purposes of simplicity, FIG. 1 will be described in conjunction with a single user 105. The user 105 may include an employee, a contractor, a manager, a partner, or any other personnel in an enterprise. The user 105 may be associated with a user device 110, which may include a desktop or laptop computer 112, a mobile phone 114, a collaboration device 116, or any other device that allows for a wired or wireless Internet connection for accessing one or more services, including the reservation service 130, on the cloud 120. By way of example, if the user device 110 is a desktop or laptop computer 112, the user 105 may open an associated web browser to access the reservation service 130 on the cloud 120. If the user device 110 is a mobile phone 114, the user 105 may use an appropriate application to access the reservation service 130. Likewise, if the user device 110 is a collaboration device 116, the collaboration device 116 may be equipped with functionality to enable Internet and cloud 120 access to thereby access the reservation service 130. In an embodiment, the collaboration device 116 may comprise a desk device, i.e., a device which sits atop a workspace in the open space environment. The open space environment may include a plurality of workspaces, and each workspace may include its own collaboration device 116. In an embodiment, the collaboration device 116 may include other functionality, e.g., telephone, messaging, facsimile, printing capabilities, etc., that may be useful in the enterprise environment. The user device 110 may be described as "associated" with the user 105 in that the user device 110 may be a personal device of the user (such as a mobile phone or laptop assigned to the user 105), or may be a device through which a user may sign-in or login (such a through a browser on a desktop, or through an application or other mechanism on a collaboration device) to access one or more services, such as the reservation service 130, on the cloud 120.

The system 100 may further include a reservation service 130 configured to make, suggest, and manage workspace reservations for a plurality of users in the open space environment. In an embodiment, the reservation service 130 may be configured to make, manage and/or track the statuses of all workspaces in the open space environment. Each time a reservation is made, cancelled, or modified by a user, the reservation (including the corresponding status of the associated workspace) may be stored in a backend database 170. The backend database 170 may store a plurality of reservations and statuses associated with the plurality of workspaces in the open space environment.

When suggesting workspaces, the reservation service 130 may be configured to access and derive user information from one or more enterprise services, including a collaboration service 160, a directory service 140, and a calendar service 150, as described below. In an embodiment (as shown in FIG. 1), the reservation service 130 may comprise a software-based service on the cloud. For example, the reservation service 130 may be an implementation of a cloud-based collaboration service 160 (such as Cisco's WebEx®). When implemented as a cloud-based service, the reservation service 130 may derive user information through the cloud 120. In another embodiment (not shown), the reservation service 130 may be incorporated as a software-based feature of the collaboration device 116. When incorporated into the collaboration device 116, the reservation service 130 may be given authorization to derive user information locally. In still other embodiments, the reservation service 130 may be incorporated into any number of other devices, platforms, or services.

In accordance with the present disclosure, the reservation service 130 may derive or obtain user information from one or more enterprise services that are used by the user 105 and that track information associated with the user 105. These enterprise services may include, but are not limited to, a collaboration service 160, a directory service 140, and a calendar service 150. Each of these will be described in turn. While the present disclosure describes each enterprise service in the singular, it is to be understood that the system 100 may include more than one directory service, more than one calendar service, and/or more than one collaboration service. It is further to be understood that the present disclosure contemplates user information may be derived from additional/other enterprise services that are not specifically described herein.

A collaboration service 160 refers to collaboration tools that enable enterprise users to engage in audio calling, video calling, audio conferencing, video conferencing, online meetings, chatting, messaging, and the sharing of information and content with other collaborators, e.g., colleagues, team members, coworkers, and/or other personnel within the enterprise. The user information derived from the collaboration service 160 may comprise collaboration data based on a collaboration history of the user 105, and may further include the identification information of one or more collaborators who are determined to have been engaged in significant or increased communications (referred to hereafter as "enhanced communications") with the user 105 during a predetermined, recent period of time. Specifically, the reservation service 130 may analyze the user's 105 recent collaboration history, i.e., the user's chatting, calling, messaging, conferencing, content sharing, and other communication history stored on the collaboration service 160 platform. From the group of all collaborators who have communicated with the user 105 over a predetermined, recent period of time, e.g., over the last seven days, over the last two weeks, or over another predetermined period of time, the reservation service 130 may determine one or more collaborators who have engaged in enhanced communications with the user 105.

A directory service 140 refers to the corporate directory of an enterprise. Thus, user information derived from the directory service 140, as it pertains to a given user, may comprise directory data associated with organizational information of the user. For example, directory data associated with organizational information of the user may include the specific organizational connections of the user 105, i.e., the names of the user's supervisor(s), manager(s), team members (collectively referred to as "team members"), as well as the locations of the team members. Directory data may further include other organizational details relating to the user 105 and/or his team members, such as their calling, messaging, e-mail and meeting identifiers, their work type (e.g., whether they are remote, mobile, or assigned to a desk), their expertise or skill, their titles, and their associated organizations and departments. Because directory data is dynamic and may change periodically, e.g., as the user 105 and/or his team members are transferred to new teams or organizations in the enterprise, directory data is derived from the directory service 140 in real-time via, for example, a directory synchronization service 142.

A calendar service 150 refers to calendaring and scheduling software (such as Microsoft Exchange Server, Google Calendar™, and the like) that allows the user 105 to plan, schedule, and manage his tasks, meetings, and appointments over a period of time (i.e., daily, weekly, monthly, etc.) The user information derived from the calendar service 150 may comprise calendar data associated with the daily schedule of the user 105, as well as the daily schedules of participants/collaborators who may be scheduled to meet with the user 105. By way of example, calendar data may include information relating to meetings, presentations, and activities scheduled on the user's calendar or the calendars of participants/collaborators who are scheduled to meet with the user 105, including e.g., times, durations, locations, participants, and formats (e.g., audio, video, live, etc.) Since a user's (and/or collaborator's) daily schedule may change at any given time, e.g., as meetings may be cancelled or rescheduled, meeting locations and/or participants may be modified, etc., calendar data is derived from the calendar service 150 in real-time via, for example, a calendar connector technology 152.

Having described the components of system 100, the operation of the system 100 will now be described. In accordance with the present disclosure, the user 105 must first register his credentials with the reservation service 130. The credentials associated with the user 105 may be stored in the cloud 120 or in a backend database 170 associated with the reservation service 130. Registration of the user 105 may include setting up a user login and password, registering an employee identification number or e-mail, or providing any other identifying credentials of the user 105. In an embodiment, registration with the reservation service 130 may be completed in conjunction with, within, or through the collaboration service 160 wherein a single sign-on mechanism (SSO) may be used to complete registration, authorization and access for both the reservation and collaboration services 130, 160. In another embodiment, registration may include obtaining face recognition or biometrics information, which may then be used to later authenticate the user.

Once the user 105 has registered with the reservation service 130, he may sign in to the reservation service 130 (including by providing any necessary credentials) at any time to reserve a workspace. The user 105 may sign in through a user device 110. For example, the user 105 may launch the appropriate browser and sign in to the reservation service 130 on his desktop or laptop computer 112, he may launch an application and sign in to the reservation service 130 on his mobile phone 114, or he may sign in to the reservation service 130 through a collaboration device 116 located at any workspace in the open space environment. Once the user 105 has successfully signed in (i.e., into the reservation service 130, or in the SSO embodiment, into the collaboration service 160, and the respective service has authenticated and identified the user 105), the user 105 may submit a request to reserve a workspace. A request for a workspace may include a specific or general time period in which the user 105 desires to reserve the workspace (e.g., all day, morning only, afternoon only, a specific block of time such as 9 am-10 am, etc.) The request may also include one or more preferences of the user 105. For example, the user 105 may indicate in the request that he prefers to work in proximity to a specific other user, in proximity to a certain location, conference room, etc. In response to the user's 105 request for a workspace, the reservation service 130 may assign a workspace, the user may select a workspace of his own choice, or the reservation service 130 may suggest one or more workspaces for consideration and selection by the user 105.

In one embodiment, the reservation service 130 may assign a workspace. Because the reservation service 130 manages and tracks the statuses of all of the workspaces in the open space environment, the reservation service 130 may identify and assign an available workspace to the user 105. The assignment may be randomly generated, or may be based on the historical usage of the user 105 (e.g., workspaces that were previously occupied by the user, etc.) or based on a preference of the user 105 as provided in the request for workspace.

In another embodiment, the user 105 may request and/or select a specific workspace. In one example, if the user 105 has a preference for a given workspace (e.g., based on its location, proximity to certain spaces, proximity to certain team members, etc.), the user may request that workspace and the reservation service may confirm the availability of the requested workspace during the period which the user 105 desires to use it. If the requested workspace is available, the reservation service 130 may make the reservation. If the requested workspace is unavailable, the reservation service 130 may prompt the user 105 to request another workspace. In an embodiment, the reservation service 130 may display on the user device 110 a map showing all of the workspaces that are currently available or will be available during the time period(s) requested by the user 105, and the user 105 may select a desired workspace for reservation. Because the reservation statuses of the workspace are stored and updated in the backend database 170, the map may display real-time statuses of all of the workspaces in the open space environment. The user 105 may view all of the available workspaces and select a suitable workspace for reservation. In yet another example, the user 105 may approach an unoccupied workspace that he desires to reserve. The user 105 may sign in to the reservation service 130 through the collaboration device 116 associated with (e.g., sitting atop) the workspace, and request the workspace. If the requested workspace is available, the reservation service 130 may make the reservation. If the requested workspace is unavailable, the reservation service 130 may prompt the user 105 to request another workspace.

In a third embodiment, the reservation service 130 may suggest one or more workspaces for consideration and selection by the user 105. The suggestions provided by the reservation service 130 may be based on analysis of dynamic user information derived from one or more enterprise services that are used by the user 105 and that track information associated with the user 105. As described above, these enterprise services may include, but are not limited to, a collaboration service 160, a directory service 140, and a calendar service 150. The reservation service 130 may analyze the dynamic user information derived from one or more of these services 140, 150, 160 and determine one or more workspace suggestions for the user.

As described above, the reservation service 130 may derive dynamic user information from a collaboration service 160, wherein the user information comprises collaboration data based on the collaboration history of the user 105 and that may include identification information of one or more collaborators who are determined to have been engaged in enhanced (significant or increased) communications with the user 105 during a predetermined, recent period of time. Specifically, the reservation service 130 may analyze the user's recent collaboration history to derive collaboration data related to, e.g., the user's chatting, calling, messaging, conferencing, content sharing, and other communication history stored on the collaboration service 160 platform. In other words, collaboration data is not merely static and/or binary connections of the user 105 (i.e., individuals that the user merely has historical or attenuated associations with), but rather reflects the dynamic and actual daily interactions of the user 105 (i.e., the individuals that the user actually and regularly communicates, interacts, and engages with in meaningful and significant ways). The reservation service 130 may use this collaboration data to determine one or more collaborators who have been engaged in enhanced communications with the user 105 over a predetermined recent period of time, e.g., over the last seven days, over the last two weeks, or over another predetermined period of time. The relevant predetermined period of time may be established by an administrator of the reservation service 130.

A collaborator may be determined to have been engaged in "enhanced communications" with the user 105 based on an analysis of weighted communication factors, which may include one or more of (but are not limited to) the following: frequency of communications between the user 105 and the collaborator (the number of times the user 105 and a collaborator have communicated during the predetermined period of time), duration of the communications (the number of hours, minutes, and/or seconds of each communication between the user 105 and the collaborator), mode(s) of the communications (the method or means of communication between the user 105 and the collaborator, i.e., chatting, electronic messaging, video calling, audio calling, video conferencing, audio conferencing, online meetings, and other modes that allow for sharing of information and content with the one or more collaborators), and the number of participants involved in the communications. For a given collaborator, each of these factors may be independently or collectively considered. For example, with respect to frequency of communications, the more frequently the user 105 and a collaborator communicate over a period of time, the more likely the communications may be determined to be enhanced. Likewise, with respect to duration of communications, longer communications between the user and the collaborator may indicate enhanced communications. With respect to mode of communication, a video call may indicate enhanced communications more than a chat. With respect to number of participants, communications in which the user and the collaborator are the only two participants may indicate enhanced communications more than communications involving a plurality of participants. Additionally, each of the foregoing communication factors may be assigned different weights relative to other factors in determining enhanced communications. For example, the duration of communications may be assigned greater weight than frequency of communications. An algorithm or other mechanism of quantitative analysis may be applied to the weighted communication factors (so that the reservation service 130 may evaluate and weigh each factor individually and/or the set of factors collectively) to determine one or more collaborators who have been engaged in enhanced communications with the user 105.

To further illustrate the derivation of collaboration data and the determination of whether one or more collaborators have engaged in enhanced communications with the user 105, consider the following example. The reservation service 130 may probe the collaboration service 160 to derive collaboration data based on a collaboration history between the user 105 and a Collaborator A. The collaboration data may indicate that the user 105 has been collaborating (e.g., calling, messaging, chatting, conferencing, meeting, and/or otherwise communicating in a manner that allows for sharing of information and content) with Collaborator A three or more times per day over the last seven days. The reservation service 130 may further determine that each collaboration session lasted at least an hour, that at least five of the sessions transpired on video calls in which the user and Collaborator A were the only participants. Applying the appropriate weights for each factor and using an algorithm and/or mechanism of quantitative analysis, the reservation service 130 may determine that Collaborator A has been engaged in enhanced communications with the user 105. The reservation service 130 may further derive collaboration data based on a collaboration history between the user 105 and a Collaborator B. The collaboration data may indicate that the user 105 has collaborated with Collaborator B once in the last seven days in a session that lasted 10 minutes and transpired via chat. Applying the appropriate weights for each communication factor and using an algorithm and/or mechanism of quantitative analysis, the reservation service 130 may conclude that Collaborator B has not been engaged in enhanced communications with the user 105. As a result, the reservation service 130 may use information relating to Collaborator A (her location, her schedule etc.), but not Collaborator B, in suggesting workspaces for the user 105.

It is to be understood that the means of determining enhanced communications is not be limited to the descriptions and examples set forth above. The present disclosure contemplates that any number and/or manner of mechanisms may be used to quantitatively and/or algorithmically determine whether communications between a user and a collaborator are enhanced, including that any number of communication factors (whether or not described herein) may be considered, any weight may be applied to each or any of the communication factors, and that any number of other factors (including but not limited to user input, user preferences, user history, etc.) may be contemplated for making this determination. Additionally, the algorithm and/or mechanism of quantitative analysis may be generated and/or modified based on any of the foregoing or other considerations.

The reservation service 130 may also derive dynamic user information from a directory service 140, wherein the user information comprises directory data associated with the organizational information of the user 105. Directory data associated with organizational information of the user may include, for example, the specific organizational connections of the user 105, such as the names of the user's team members, as well as one or more locations associated with the user's team members (e.g., meeting spaces, conference rooms, etc. that have been assigned to the team and/or team members). Directory data may further include other organizational details relating to the user 105 and/or his team members, such as their calling, messaging, e-mail and meeting identifiers, their work type (e.g., whether they are remote, mobile, or assigned to a desk), their expertise or skill, their titles, and their associated organizations and departments. The reservation service 130 may analyze user information from the directory service 140, namely the directory data, to determine one or more workspace suggestions for the user 105. Workspace suggestions based on directory data may include, but are not limited to, workspaces that are in proximity to one or more team members of the user 105, or in proximity to one or more locations associated with the user's team.

The reservation service 130 may further derive dynamic user information from a calendar service 150, wherein the user information comprises calendar data associated with the daily schedule of the user 105, as well as the daily schedules of participants/collaborators who may be scheduled to meet with the user. As described above, calendar data may include, for example, information relating to meetings, presentations, and activities (collectively, "events") scheduled on the user's 105 calendar and/or the calendars of participants/collaborators who are scheduled to meet with the user 105, including e.g., event times and durations, event locations, event participants, resources, and event formats. The reservation service 130 may analyze user information from the calendar service 150 (namely, the calendar data) to determine one or more workspace suggestions for the user 105. In an embodiment, workspace suggestions based on calendar data may include workspaces that are in proximity to or within a convenient distance to the locations of one or more events scheduled on the user's daily calendar, and/or workspaces that are in proximity to participants attending the scheduled events. Therefore, for example, if the user has a meeting scheduled on the third floor of a particular building, the reservation service may suggest a workspace that is within the particular building and on the third floor to reduce the travel time of the user.

Next, the reservation service 130 may analyze all of the user information derived from the enterprise services, i.e., collaboration data from the collaboration service 160, directory data from the directory service 140, and calendar data from the calendar service 150 (as well as any other user information from any other enterprise service(s)), and determine one or more workspace suggestions for the user. In an embodiment, the reservation service 130 may analyze the user information by applying one or more algorithms and/or calculations, wherein user information derived from different enterprise services are assigned different weights. By way of example, the algorithm may assign greater weight to collaboration data from the collaboration service 160 than the directory data from the directory service 140. Additionally, common data derived from two or more enterprise services may also be assigned greater weight. For example, if collaboration data indicates that Collaborator A has been engaged in enhanced communications with the user 105, and directory data indicates that the same Collaborator A is a team member of the user 105, the reservation service may apply the appropriate weight to determine a workspace suggestion based on the location of Collaborator A. By algorithmically analyzing the user information in this manner, the reservation service may determine and provide one or more workspace suggestions to the user device 110 for selection by the user 105. In an embodiment, the reservation service 130 may also analyze any preferences listed in the user's 105 request for a workspace, and the algorithms and/or calculations may account for these preferences when determining one or more workspace suggestions. It is to be understood that the algorithms and/or calculations that are applied and the weights that are assigned to the different types of user information are not to be limited in any manner, and may be determined and/or modified based on the requirements of the enterprise.

The one or more workspace suggestions may be transmitted to and displayed on the user device 110. In an embodiment, the workspace suggestions may be displayed on a user device 110 in a map format, wherein the map shows a layout of the open space environment. Workspaces suggested by the reservation service 130 may be highlighted on the map and may further include brief descriptions or indications as to why they were suggested for the user. For example, if a workspace was suggested to the user based on collaboration data (i.e., because a particular collaborator has been recently engaged in enhanced communications with the user), the suggested workspace may be highlighted on the map and may indicate, by highlighting or otherwise, the location of the particular collaborator with whom the user 105 has been engaged. In another example, if a workspace was suggested to the user based on calendar data (i.e., because the workspace is close in proximity to the location of one or more meetings scheduled by the user), the suggested workspace may be highlighted on the map and the map may provide a visual indication of the proximity to the meeting location. The one or more workspace suggestions transmitted to and displayed on the user device 110 reflect the real-time status of the associated workspaces. Therefore, if another user selects and reserves a workspace corresponding to a workspace suggestion provided by the reservation service, the status of that workspace may be updated in the reservation service 130 to indicate that it is no longer available.

The user 105 may view the one or more workspace suggestions and then select a desired workspace. The user's 105 selection may be transmitted to the reservation service 130, and the reservation service 130 may then reserve the workspace in accordance with the user's workspace selection. The reservation may identify the user, the status of the reserved workspace, and the time period in which the user has reserved the workspace, and may be stored in the backend database 170. The status of the reserved workspace will be tracked by the reservation service 130 and shown on user devices as unavailable for the time period in which the user 105 reserved the workspace. As a result, when another user (not shown) tries to make a reservation, the status of the workspace selected by the user 105 will be shown as "reserved" or "unavailable" for the time period in which the user 105 reserved the workspace. It is to be understood that "reserving" a workspace may include the making, updating, or modifying of a workspace reservation by the user 105.

Figure 2:
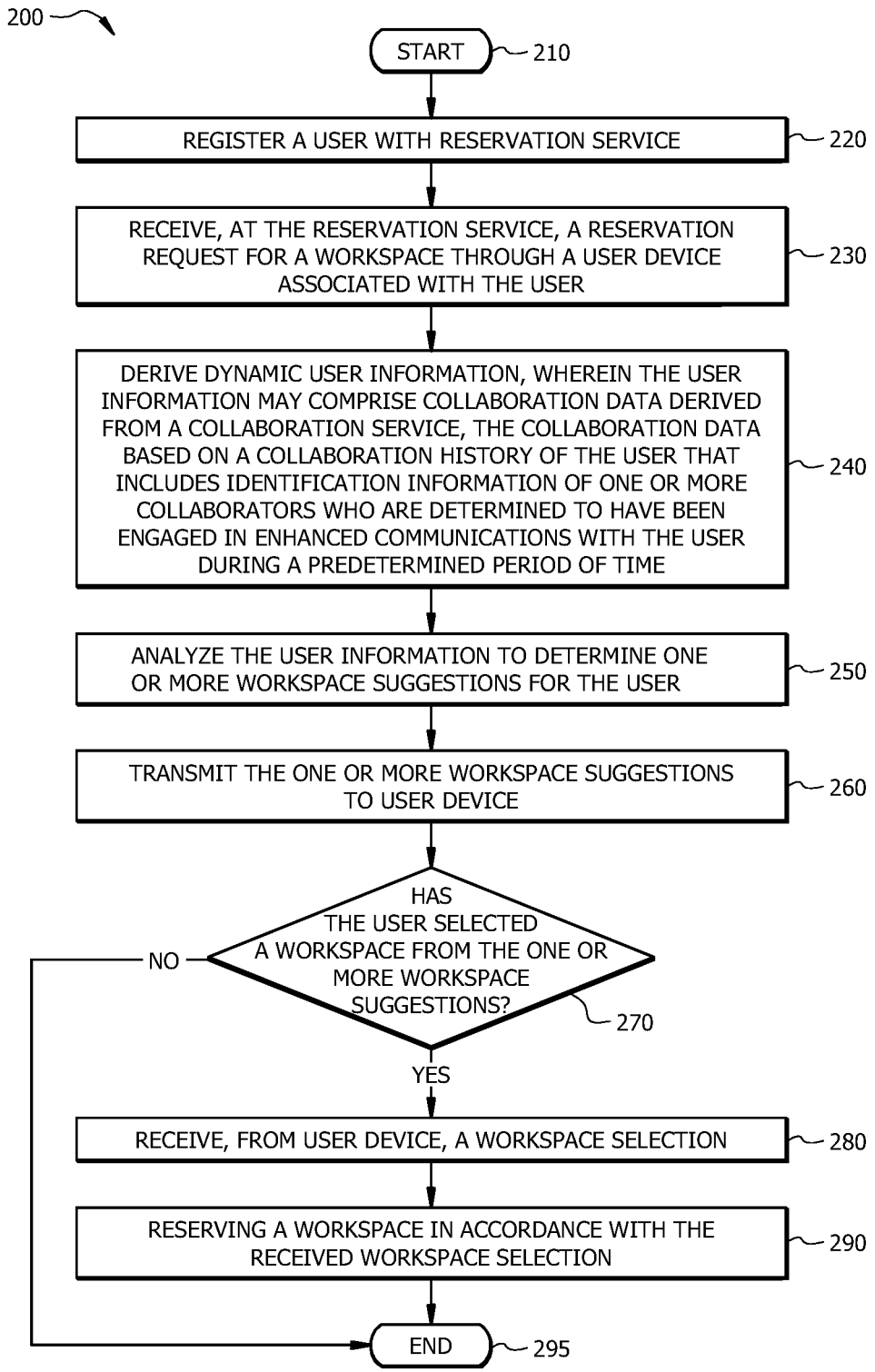
FIG. 2 illustrates a flow diagram of a method for optimizing dynamic open space environments, in accordance with certain embodiments.

Reference is now made to FIG. 2, wherein is shown a flow diagram of a method 200 for optimizing a dynamic open space environment. The steps of method 200 may be in accord with the operations outlined in conjunction with system 100 of FIG. 1. As such, similar and corresponding terms described in conjunction with FIG. 1 have the same meaning when used in conjunction with method 200 of FIG. 2. Additionally, the present disclosure incorporates by reference the description of system 100 above for the purposes of explaining, expounding upon, or otherwise clarifying any of the steps of method 200. Finally, method 200 may be implemented from the perspective of a reservation service, which may be a software-based service on the cloud or a software-based service on a physical device, such as a collaboration device, as that term is defined herein.

The method may begin at step 210. At step 220, a user may be registered with the reservation service. Registration of the user may include setting up a user login and password, registering an employee identification number or e-mail, or providing any other identifying credentials of the user. The credentials associated with the user may be stored in the cloud or in a database associated with the reservation service. A plurality of users of an enterprise may be registered with the reservation service. In an embodiment, registration with the reservation service may be completed in conjunction with, within, through a collaboration service (as that term is defined below), wherein a single sign-on mechanism may be used to complete registration, authorization and/or access for both the reservation and collaboration services. In another embodiment, registration may include face recognition or biometrics information, which may then be used to later authenticate the user.

At step 230, a reservation request for a workspace may be received by the reservation service through a user device associated with the registered user. A user device may include, by way of example, a desktop or laptop computer, a mobile phone, or a collaboration device. In an embodiment, a collaboration device may comprise a desk device, i.e., a device which sits atop a workspace in the open space environment, having a wired or wireless internet capability. The open space environment may include a plurality of workspaces, and each workspace may include its own collaboration device. The collaboration device may include other functionality, e.g., telephone, messaging, facsimile, printing capabilities, etc., that may be useful in the enterprise environment. The user device may be "associated" with the user in that the user device may be a personal device of the user (such as a mobile phone or laptop assigned to the user), or may be a device through which a user may sign-in or login (such a through a browser on a desktop, or through an application or other mechanism on a collaboration device) to access the reservation service. For example, the user may launch the appropriate browser and sign in to the reservation service on his desktop or laptop computer, he may launch an application and sign in to the reservation service on his mobile phone, he may sign in to the reservation service through a collaboration device located at any workspace in the open space environment, or he may use the single sign-on mechanism through the collaboration service, as described above. Once the user has successfully signed in (i.e., the reservation service has authenticated and identified the user), the user may submit a reservation request to reserve a workspace. A reservation request for a workspace may include a specific or general time period in which the user desires to reserve the workspace (e.g., all day, morning only, afternoon only, a specific block of time such as 9 am-10 am, etc.) The request may also include one or more preferences of the user. For example, the user may indicate in the request that he prefers to work in proximity to a specific other user, to a certain location, conference room, etc.

At step 240, dynamic user information may be derived. Dynamic user information may be derived from one or more enterprise services that are used by the user and that track information associated with the user. As described above in conjunction with system 100, dynamic user information may comprise collaboration data obtained from a collaboration service, directory data from a directory service, and/or calendar data from a calendar service. While step 240 of FIG. 2 shows user information as collaboration data from a collaboration service, the present disclosure is not to be so limited. User information may comprise data obtained from any of a plurality of enterprise services, including enterprise services not specifically described herein.

In an embodiment, the user information may comprise collaboration data derived from a collaboration service. A collaboration service refers to collaboration tools that enable enterprise users to engage in audio calling, video calling, audio conferencing, video conferencing, online meetings, chatting, messaging, and the sharing of information and content with other collaborators, e.g., colleagues, team members, coworkers, and/or other personnel within the enterprise. The collaboration data derived from the collaboration service may be based on a collaboration history of the user that includes identification information of one or more collaborators who are determined to have been engaged in enhanced communications with the user during a predetermined, recent period of time. Specifically, the reservation service may analyze the user's recent collaboration history to derive collaboration data related to, e.g., the user's chatting, call, messaging, conferencing, content sharing, and other communication history stored on the collaboration service platform. Thus, collaboration data is not merely static and/or binary connections of the user (i.e., individuals that the user has historical or attenuated associations with), but rather reflects the dynamic and actual daily interactions of the user (i.e., the individuals that the user actually and regularly communicates, interacts, and engages with in meaningful and significant ways). The reservation service may use this collaboration data to determine one or more collaborators who have been engaged in enhanced communications with the user over a predetermined period of time, e.g., over the last seven days, over the last two weeks, or over another predetermined period of time. In an embodiment, the relevant predetermined period of time may be established by an administrator of the reservation service.

A collaborator may be determined to have been engaged in "enhanced communications" with the user based on an analysis of weighted communication factors, which may include one or more of (but are not limited to) the following: frequency of communications between the user and the collaborator (the number of times the user and the collaborator have communicated during the predetermined period of time), duration of the communications (the number of hours, minutes, and/or seconds of each communication between the user and the collaborator), mode(s) of the communications (the method or means of communication between the user and the collaborator, i.e., chatting, electronic messaging, video calling, audio calling, video conferencing, audio conferencing, online meetings, and other modes that allow for sharing of information and content with the one or more collaborators), and the number of participants involved in the communications. For a given collaborator, each of these factors may be independently or collectively considered. For example, with respect to frequency of communications, the more frequently the user and a collaborator communicate over a period of time, the more likely the communications may be determined to be enhanced. Likewise, with respect to duration of communications, longer communications between the user and the collaborator may indicate enhanced communications. With respect to mode of communication, a video call may indicate enhanced communications more than a chat. With respect to number of participants, communications in which the user and the collaborator are the only two participants may indicate enhanced communications more than communications involving a plurality of participants. Additionally, each of the foregoing communication factors may be assigned different weights relative to other factors in determining enhanced communications. For example, the duration of communications may be assigned greater weight than frequency of communications. As described above in conjunction with system 100 of FIG. 1, an algorithm or other mechanism of quantitative analysis may be applied to the weighted communication factors (wherein the reservation service may evaluate and weigh each factor individually and/or the set of factors collectively) to determine one or more collaborators who have been engaged in enhanced communications with the user.

Dynamic user information may also be derived from one or more additional enterprise services that are used by the user and that track information associated with the user. In addition to collaboration data derived from a collaboration service, dynamic user information may include, but is not limited to, directory data derived from a directory service and calendar data derived from a calendar service. Each of these additional categories of user information and the services from which they are derived will be addressed in turn.

First, the dynamic user information may comprise directory data derived from a directory service. The directory data may be associated with organizational information of the user. For example, directory data associated with organizational information of the user may include the specific organizational connections of the user, such as the names of the user's team members, and/or one or more locations associated with the user's team members (e.g., meeting spaces, conference rooms, etc. that have been assigned to the team and/or team members). Directory data may further include other organizational details associated with the user and/or his team members, such as their calling, messaging, e-mail and meeting identifiers, their work type (e.g., whether they are remote, mobile, or assigned to a desk), their expertise or skill, their titles, and their associated organizations and departments. The reservation service may analyze user information from the directory service, namely the directory data, to determine one or more workspace suggestions for the user. Workspace suggestions based on directory data may include, but are not limited to, workspaces that are in proximity to one or more team members of the user, or in proximity to one or more locations associated with the user's team.

Next, dynamic user information may comprise calendar data derived from a calendar service. A calendar service refers to calendaring and scheduling software (such as Microsoft Exchange Server, Google Calendar™, and the like) that allows the user to plan, schedule, and manage his tasks, meetings, and appointments over a period of time (i.e., daily, weekly, monthly, etc.). The calendar data derived from a calendar service may be associated with the daily schedule of the user, as well as the daily schedules of participants/collaborators who may be scheduled to meet with the user 105. Calendar data may include, for example, information relating to meetings, presentations, and activities (collectively, "events") scheduled on the user's calendar or the calendars of participants/collaborators scheduled to meet with the user, including e.g., event times and durations, event locations, event participants, and event formats. The reservation service may analyze user information from the calendar service (namely, the calendar data) to determine one or more workspace suggestions for the user. In an embodiment, workspace suggestions based on calendar data may include workspaces that are in proximity to or within a convenient distance of the locations of one or more events scheduled on the user's daily calendar and/or workspaces that are in proximity to participants attending the scheduled events. Therefore, for example, if the user has a meeting scheduled on the third floor of a particular building, the reservation service may suggest a workspace that is within the particular building and on the third floor to reduce the travel time of the user.

At step 250, the user information may be analyzed to determine one or more workspace suggestions for the user. In an embodiment, where user information includes data from various enterprise services, the reservation service may analyze all of the user information derived from the enterprise services, i.e., collaboration data from the collaboration service, directory data from the directory service, and/or calendar data from the calendar service (and any other data derived from any other enterprise services), and determine one or more workspace suggestions for the user. The reservation service may analyze the user information by applying one or more algorithms and/or calculations, wherein user information derived from different enterprise services are assigned different weights. By way of example, the algorithm may assign greater weight to collaboration data from the collaboration service than the directory data from the directory service. Additionally, common data derived from two or more enterprise services may also be assigned greater weight. In this manner, the reservation service may determine and provide one or more workspace suggestions to the user for his selection. In an embodiment, the reservation service may also analyze any preferences listed in the user's request for a workspace, and the algorithms and/or calculations may take into account these preferences when determining one or more workspace suggestions. It is to be understood that the algorithms and/or calculations that are applied and the weights that are assigned to the different types of user information are not to be limited in any manner, and may be determined and/or modified based on the requirements of the enterprise.

In another embodiment, dynamic user information from a single enterprise service may be analyzed to determine one or more workspace suggestions for the user. For example, user information comprising collaboration data obtained from the collaboration service may be analyzed to determine one or more workspace suggestions for the user. Specifically, the reservation service may analyze the collaboration data, e.g., the identification information of one or more collaborators who have been engaged in enhanced communications with the user, and suggest one or more workspaces based on the locations of a subset of collaborators (i.e., the collaborators who have been most engaged with the user) from the group of one or more collaborators.

At step 260, the one or more workspace suggestions may be transmitted to the user device for selection by the user. In an embodiment, the workspace suggestions may be displayed on a user device in a map format, wherein the map shows a layout of the open space environment. Workspaces suggested by the reservation service may be highlighted on the map and may further include brief descriptions or indications as to why they were suggested for the user. For example, if a workspace was suggested to the user based on collaboration data (i.e., because a particular collaborator has been recently engaged in enhanced communications with the user), the suggested workspace may be highlighted on the map and may indicate, by highlighting or otherwise, the location of the particular collaborator with whom the user has been engaged. In another example, if a workspace was suggested to the user based on calendar data (i.e., because the workspace is in close proximity to the location of one or more meetings scheduled by the user), the suggested workspace may be highlighted on the map along with a visual indication of its proximity to the meeting location. The one or more workspace suggestions transmitted to and displayed on the user device reflect the real-time status of the associated workspaces. Therefore, if another user selects and reserves a workspace corresponding to a workspace suggestion provided by the reservation service, that workspace may be updated in the reservation service to indicate that it is no longer available.

At step 270, a determination may be made as to whether the user has selected a workspace from the one or more workspace suggestions. In an embodiment, the user may select a workspace by selecting a graphical representation of the workspace through a display on the user device. If, at step 270, it is determined that the user has not selected a workspace from the one or more workspace suggestions, the method may end at step 295. If, however, at step 270, it is determined that the user has selected a workspace from the one or more workspace suggestions, the method may proceed to step 280, wherein the workspace selection is received through the user device.

At step 290, the reservation service may reserve the workspace in accordance with the user's workspace selection. The reservation may identify the user, the status of the reserved workspace, and the time period in which the user has reserved the workspace, and may be stored in the backend database. The status of the reserved workspace will be tracked by the reservation service and shown on user devices as unavailable for the time period in which the user has reserved the workspace. As a result, when another user (not shown) tries to make a reservation, the status of the workspace selected by the user will be shown as unavailable for the time period in which the user reserved the workspace. It is to be understood that "reserving" a workspace may include the making, updating, modifying of a workspace by the user. At step 295, the method may end.

In sum, the systems and methods of the present disclosure may enable meaningful workspace reservations by utilizing data from one set of tools (i.e., enterprise services such as directory, calendar, and collaboration services that are used by the user) to make a decision on a separate reservation tool (reservation service). It is to be understood that the concepts of the present disclosure are not to be limited to the specific embodiments described herein. For example, the present disclosure may be applied in contexts outside of the enterprise open space environment, including for making and managing workspace/desk reservations in academic institutions, and the like.

Figure 3:
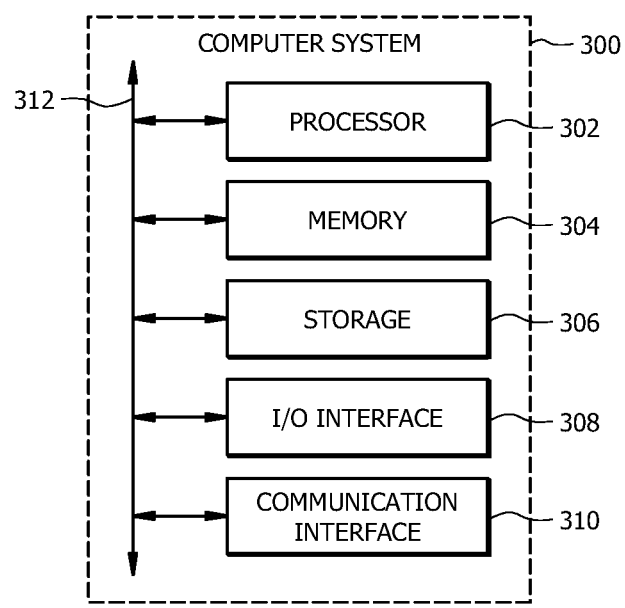
FIG. 3 illustrates a computer system, in accordance with certain embodiments.

Reference is now made to FIG. 3, wherein is shown an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors; and
   one or more computer-readable non-transitory storage media comprising instructions that, when executed by the one or more processors, cause one or more components of the system to perform operations comprising:
      receiving a reservation request for a workspace through a user device associated with a user;
      deriving dynamic user information, wherein the user information comprises collaboration data derived from a collaboration service, the collaboration data based on a collaboration history of the user that includes identification information of one or more collaborators who are determined to have been engaged in enhanced communications with the user during a predetermined period of time;
      analyzing the user information to determine one or more workspace suggestions for the user, wherein the one or more workspace suggestions are based on a proximity of the one or more workspace suggestions to a defined user preference;
      transmitting the one or more workspace suggestions to the user device;
      receiving, through the user device, a workspace selection from the one or more workspace suggestions; and
      updating a reservation of the user in accordance with the workspace selection.

2. The system of claim 1, wherein the one or more collaborators are determined to have been engaged in enhanced communications with the user based on an analysis of weighted communication factors, the weighted communication factors comprising one or more of frequency of communications between the user and the one or more collaborators, duration of the communications, modes of the communications, and a number of participants involved in the communications.

3. The system of claim 2, wherein the modes of the communications comprise one or more of the following: chatting, electronic messaging, video calling, audio calling, video conferencing, audio conferencing, online meetings, and other modes that allow for sharing of information and content with the one or more collaborators.

4. The system of claim 2, wherein an algorithm is applied to the weighted communication factors to determine the one or more collaborators who have been engaged in enhanced communications with the user.

5. The system of claim 1, wherein the user information further comprises directory data derived from a directory service, the directory data associated with organizational information of the user.

6. The system of claim 1, wherein the user information further comprises calendar data derived from a calendar service, the calendar service associated with a daily schedule of the user and daily schedules of collaborators who collaborate with the user.

7. The system of claim 1, wherein the one or more workspace suggestions, along with one or more reasons for the workspace suggestions, are displayed in a map format on the user device.

8. A method, comprising:
receiving a reservation request for a workspace through a user device associated with a user;
deriving dynamic user information, wherein the user information comprises collaboration data derived from a collaboration service, the collaboration data based on a collaboration history of the user that includes identification information of one or more collaborators who are determined to have been engaged in enhanced communications with the user during a predetermined period of time;
analyzing the user information to determine one or more workspace suggestions for the user, wherein the one or more workspace suggestions are based on a proximity of the one or more workspace suggestions to a defined user preference;
transmitting the one or more workspace suggestions to the user device;
receiving, through the user device, a workspace selection from the one or more workspace suggestions; and
updating a reservation of the user in accordance with the workspace selection.

9. The method of claim 8, wherein the one or more collaborators are determined to have been engaged in enhanced communications with the user based on an analysis of weighted communication factors, the weighted communication factors comprising one or more of frequency of communications between the user and the one or more collaborators, duration of the communications, modes of the communications, and a number of participants involved in the communications.

10. The method of claim 9, wherein the modes of the communications comprise one or more of the following: chatting, electronic messaging, video calling, audio calling, video conferencing, audio conferencing, online meetings, and other modes that allow for sharing of information and content with the one or more collaborators.

11. The method of claim 9, wherein an algorithm is applied to the weighted communication factors to determine the one or more collaborators who have been engaged in enhanced communications with the user.

12. The method of claim 8, wherein the user information further comprises directory data derived from a directory service, the directory data associated with organizational information of the user.

13. The method of claim 8, wherein the user information further comprises calendar data derived from a calendar service, the calendar data associated with a daily schedule of the user and daily schedules of collaborators who collaborate with the user.

14. The method of claim 8, wherein the one or more workspace suggestions, along with one or more reasons for the workspace suggestions, are displayed in a map format on the user device.

15. One or more computer-readable non-transitory storage media embodying instructions that, when executed by a processor, cause performance of operations comprising:
receiving a reservation request for a workspace through a user device associated with a user;
deriving dynamic user information, wherein the user information comprises collaboration data derived from a collaboration service, the collaboration data based on a collaboration history of the user that includes identification information of one or more collaborators who are determined to have been engaged in enhanced communications with the user during a predetermined period of time;
analyzing the user information to determine one or more workspace suggestions for the user, wherein the one or more workspace suggestions are based on a proximity of the one or more workspace suggestions to a defined user preference;
transmitting the one or more workspace suggestions to the user device;
receiving, through the user device, a workspace selection from the one or more workspace suggestions; and
updating a reservation of the user in accordance with the workspace selection.

16. The one or more computer-readable non-transitory storage media of claim 15, wherein the one or more collaborators are determined to have been engaged in enhanced communications with the user based on an analysis of weighted communication factors, the weighted communication factors comprising one or more of frequency of communications between the user and the one or more collaborators, duration of the communications, modes of the communications, and a number of participants involved in the communications.

17. The one or more computer-readable non-transitory storage media of claim 16, wherein the modes of the communications comprise one or more of the following: chatting, electronic messaging, video calling, and audio calling, video conferencing, audio conferencing, online meetings, and other modes that allow for sharing of information and content with the one or more collaborators.

18. The one or more computer-readable non-transitory storage media of claim 16, wherein an algorithm is applied to the weighted communication factors to determine the one or more collaborators who have been engaged in enhanced communications with the user.

19. The one or more computer-readable non-transitory storage media of claim 15, wherein the user information further comprises directory data derived from a directory service, the directory data associated with organizational information of the user.

20. The one or more computer-readable non-transitory storage media of claim 15, wherein the user information further comprises calendar data derived from a calendar service, the calendar data associated with a daily schedule of the user and daily schedules of collaborators who collaborate with the user.

* * * * *